United States Patent
Bowcutt et al.

(10) Patent No.: US 6,282,208 B1
(45) Date of Patent: *Aug. 28, 2001

(54) DATA TRAFFIC CONTROL IN A DATA MODEM SYSTEM

(75) Inventors: Roy A. Bowcutt, Alpharetta; Brett Black, Gainesville; Jeffery L. Thompson, Lawrenceville, all of GA (US)

(73) Assignee: Scientific-Atlanta, Inc., Lawrenceville, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,711

(22) Filed: Dec. 17, 1997

Related U.S. Application Data

(60) Provisional application No. 60/035,618, filed on Jan. 17, 1997.

(51) Int. Cl.[7] .............................. G08C 15/00; H04L 12/56
(52) U.S. Cl. ..................... 370/486; 370/389; 370/235; 370/252; 375/222; 709/252
(58) Field of Search ..................................... 370/384, 486, 370/487, 389, 347, 258, 235, 252; 348/6, 7, 17, 12; 709/252; 455/5.1, 419; 345/327; 375/222

(56) References Cited

U.S. PATENT DOCUMENTS

| 3,985,962 | 10/1976 | Jones et al. ........................... 370/455 |
| 4,186,380 | 1/1980 | Edwin et al. ............................. 714/4 |
| 4,207,431 | 6/1980 | McVoy ..................................... 379/22 |
| 4,361,851 | 11/1982 | Asip et al. ................................ 348/3 |
| 4,475,123 | 10/1984 | Dumbauld et al. .................. 380/211 |
| 4,491,983 | 1/1985 | Pinnow et al. ........................ 359/189 |
| 4,528,589 | 7/1985 | Block et al. ........................... 380/241 |
| 4,536,791 | 8/1985 | Campbell et al. .................... 348/5.5 |
| 4,577,224 | 3/1986 | Ost ........................................ 380/241 |
| 4,601,028 | 7/1986 | Huffman et al. ...................... 370/217 |

(List continued on next page.)

OTHER PUBLICATIONS

ATM: Foundation for Broadband Networks: vol. I, Second Edition, 1999, Uyless Black, Chapter 10.
Data Link Protocols, 1993, Uyless Black, Chapter 8.
Frame Relay Networks: Specifications and Implementations, 1996, Uyless Black, Chapter 10.
ISDN: Concepts, Facilities, and Services, Third Edition, 1997, Gary C. Kessler and Peter V. Southwick, Chapter 6.
ISDN and Broadband ISDN with Frame Relay and ATM, Fourth Edition, 1999, William Stallings, Chapter 8 and Chapter 12.
ISDN & SS7: Architectures for Digital Signaling Networks, 1997, Uyless Black, Chapter 3.
The V Series Recommendations: Standards for Data Communications over the Telephone Network, Second Edition, 1995, Appendix A.

(List continued on next page.)

Primary Examiner—Ajit Patel
Assistant Examiner—John Pezzlo
(74) Attorney, Agent, or Firm—Kenneth M. Massaroni; Kelly A. Gardner; Hubert J. Barnhardt, III

(57) ABSTRACT

Method and apparatus for monitoring data traffic through a cable data network in order to guarantee a minimum and maximum bandwidth and burst length. Traffic statistics are kept as credits that are only updated as needed. Each cable modem in the network is assigned a limit on the maximum amount of traffic that it may transmit and receive depending on the service level that the subscriber has purchased. When that limit is exceeded, traffic for that modem will no longer allowed to pass through the system.

26 Claims, 3 Drawing Sheets

U.S. PATENT DOCUMENTS

| | | | |
|---|---|---|---|
| 4,633,462 | 12/1986 | Stifle et al. | 370/448 |
| 4,641,304 | 2/1987 | Raychaudhuri | 370/447 |
| 4,672,533 | 6/1987 | Nobel et al. | 340/825.34 |
| 4,757,460 | 7/1988 | Bione et al. | 709/248 |
| 4,771,391 | 9/1988 | Blasbalg | 709/232 |
| 4,804,248 | 2/1989 | Bhagavatula | 385/28 |
| 4,823,386 | 4/1989 | Dumbauld et al. | 380/211 |
| 4,858,224 | 8/1989 | Nakano et al. | 370/217 |
| 4,907,224 | 3/1990 | Scoles et al. | 370/443 |
| 4,912,721 | 3/1990 | Pidgeon, Jr. et al. | 375/149 |
| 4,980,886 | 12/1990 | Bernstein | 370/433 |
| 5,012,469 | 4/1991 | Sardana | 370/322 |
| 5,014,125 | 5/1991 | Pocock et al. | 348/7 |
| 5,050,213 | 9/1991 | Shear | 705/53 |
| 5,113,499 | 5/1992 | Ankey et al. | 340/825.34 |
| 5,131,041 | 7/1992 | Brunner et al. | 370/219 |
| 5,136,690 | 8/1992 | Becker et al. | 345/349 |
| 5,142,690 | 8/1992 | McMullan, Jr. et al. | 455/6.1 |
| 5,155,590 | 10/1992 | Beyers, II et al. | 348/12 |
| 5,157,657 | 10/1992 | Potter et al. | 370/440 |
| 5,159,592 | 10/1992 | Perkins | 370/338 |
| 5,166,930 | 11/1992 | Braff et al. | 370/235 |
| 5,166,931 | 11/1992 | Riddle | 370/401 |
| 5,181,107 | 1/1993 | Rhoades | 348/13 |
| 5,185,860 | 2/1993 | Wu | 709/224 |
| 5,195,092 | 3/1993 | Wilson | 348/13 |
| 5,208,665 | 5/1993 | McCalley | 348/12 |
| 5,214,390 | 5/1993 | Montreuil | 329/309 |
| 5,226,120 | 7/1993 | Brown et al. | 709/224 |
| 5,235,619 | 8/1993 | Beyers, II et al. | 375/260 |
| 5,239,540 | 8/1993 | Roviera et al. | 370/345 |
| 5,251,324 | 10/1993 | McMullan, Jr. | 455/2 |
| 5,261,044 | 11/1993 | Dev et al. | 345/357 |
| 5,271,041 | 12/1993 | Montreuil | 375/344 |
| 5,276,789 | 1/1994 | Besaw et al. | 345/140 |
| 5,278,833 | 1/1994 | Crisler et al. | 370/348 |
| 5,287,351 | 2/1994 | Wall, Jr. | 370/206 |
| 5,295,140 | 3/1994 | Crisler et al. | 370/443 |
| 5,295,244 | 3/1994 | Dev et al. | 345/357 |
| 5,303,234 | 4/1994 | Kou | 370/442 |
| 5,327,554 | 7/1994 | Palazzi, III et al. | 348/13 |
| 5,333,183 | 7/1994 | Herbert | 379/112 |
| 5,347,304 | 9/1994 | Moura et al. | 348/12 |
| 5,361,259 | 11/1994 | Hunt et al. | 370/402 |
| 5,384,777 | 1/1995 | Ahmadi et al. | 370/337 |
| 5,390,181 | 2/1995 | Campbell et al. | 370/449 |
| 5,404,505 | 4/1995 | Levinson | 707/10 |
| 5,421,030 * | 5/1995 | Baran | 455/5.1 |
| 5,423,003 | 6/1995 | Berteau | 370/254 |
| 5,423,006 | 6/1995 | Brown et al. | 710/19 |
| 5,436,909 | 7/1995 | Dev et al. | 714/4 |
| 5,440,555 | 8/1995 | Momona | 370/455 |
| 5,471,399 | 11/1995 | Tanaka et al. | 716/11 |
| 5,473,599 | 12/1995 | Li et al. | 370/219 |
| 5,481,542 | 1/1996 | Logston et al. | 348/7 |
| 5,483,631 | 1/1996 | Nagi et al. | 345/329 |
| 5,504,921 | 4/1996 | Dev et al. | 709/223 |
| 5,515,361 | 5/1996 | Li et al. | 370/222 |
| 5,515,418 | 5/1996 | Yamaguchi et al. | 379/34 |
| 5,517,488 | 5/1996 | Miyazaki et al. | 370/225 |
| 5,517,502 | 5/1996 | Bestler et al. | 370/449 |
| 5,517,618 | 5/1996 | Wada et al. | 709/223 |
| 5,521,925 | 5/1996 | Merakos et al. | 370/337 |
| 5,533,108 | 7/1996 | Harris et al. | 379/201 |
| 5,534,913 * | 7/1996 | Majeti et al. | 348/7 |
| 5,535,206 | 7/1996 | Bestler et al. | 370/458 |
| 5,535,403 | 7/1996 | Li et al. | 345/348 |
| 5,553,095 * | 9/1996 | Engdahl et al. | 375/222 |
| 5,553,287 | 9/1996 | Bailey et al. | 709/701 |
| 5,572,640 | 11/1996 | Schettler | 345/440 |
| 5,586,121 | 12/1996 | Moura et al. | 370/404 |
| 5,594,798 | 1/1997 | Cox et al. | 380/257 |
| 5,604,528 | 2/1997 | Edwards et al. | 348/5.5 |
| 5,608,446 * | 3/1997 | Carr et al. | 348/6 |
| 5,610,910 | 3/1997 | Focsaneaunu et al. | 370/351 |
| 5,612,959 | 3/1997 | Takase et al. | 370/390 |
| 5,644,706 | 7/1997 | Ruigrok et al. | 714/48 |
| 5,650,994 | 7/1997 | Daley | 370/259 |
| 5,654,746 | 8/1997 | McMullan, Jr. et al. | 348/6 |
| 5,666,358 * | 9/1997 | Paratore et al. | 370/347 |
| 5,675,732 | 10/1997 | Majeti et al. | 709/235 |
| 5,701,465 | 12/1997 | Baugher et al. | 707/10 |
| 5,703,795 * | 12/1997 | Mankovitz | 345/327 |
| 5,706,277 | 1/1998 | Klink | 370/220 |
| 5,708,655 | 1/1998 | Toth et al. | 370/313 |
| 5,710,884 | 1/1998 | Dedrick | 709/217 |
| 5,712,897 | 1/1998 | Ortel | 379/22 |
| 5,720,025 | 2/1998 | Wilkes et al. | 714/6 |
| 5,721,780 | 2/1998 | Ensor et al. | 713/155 |
| 5,724,492 | 3/1998 | Matthews et al. | 345/419 |
| 5,729,682 | 3/1998 | Marquis et al. | 709/229 |
| 5,737,311 | 4/1998 | Wyld | 370/227 |
| 5,737,316 | 4/1998 | Lee | 370/248 |
| 5,751,706 | 5/1998 | Land et al. | 370/352 |
| 5,751,707 * | 5/1998 | Voit et al. | 370/384 |
| 5,751,971 | 5/1998 | Dobbins et al. | 709/238 |
| 5,768,280 | 6/1998 | Way | 370/486 |
| 5,790,548 | 8/1998 | Sistanizadeh et al. | 370/401 |
| 5,790,806 * | 8/1998 | Koperda | 709/252 |
| 5,793,753 | 8/1998 | Hershey et al. | 370/252 |
| 5,796,718 | 8/1998 | Caterisano | 370/217 |
| 5,799,002 | 8/1998 | Krishnan | 370/234 |
| 5,799,016 | 8/1998 | Onweller | 370/401 |
| 5,805,591 | 9/1998 | Naboulsi et al. | 370/395 |
| 5,805,596 | 9/1998 | Kranzler et al. | 370/445 |
| 5,808,671 | 9/1998 | Maycock et al. | 348/180 |
| 5,808,886 | 9/1998 | Suzuki | 700/34 |
| 5,812,819 | 9/1998 | Rodwin et al. | 703/23 |
| 5,818,845 | 10/1998 | Moura et al. | 370/449 |
| 5,822,319 | 10/1998 | Nagami et al. | 370/392 |
| 5,828,655 | 10/1998 | Moura et al. | 370/236 |
| 5,828,666 | 10/1998 | Focsaneanu et al. | 370/389 |
| 5,835,696 | 11/1998 | Hess | 714/10 |
| 5,841,468 | 11/1998 | Wright | 348/6 |
| 5,845,091 | 12/1998 | Dunne et al. | 709/240 |
| 5,859,852 | 1/1999 | Moura et al. | 370/449 |
| 5,881,243 | 3/1999 | Zaumen et al. | 709/241 |
| 5,884,024 | 3/1999 | Lim et al. | 713/204 |
| 5,884,284 | 3/1999 | Peters et al. | 705/30 |
| 5,892,812 | 4/1999 | Pester, III | 379/34 |
| 5,894,479 | 4/1999 | Mohammed | 370/401 |
| 5,903,572 | 5/1999 | Wright | 370/524 |
| 5,905,714 | 5/1999 | Havansi | 370/242 |
| 5,959,972 | 9/1999 | Hamami | 370/228 |
| 5,966,163 | 10/1999 | Lin et al. | 348/12 |
| 5,999,970 | 12/1999 | Krisbergh | 709/217 |
| 6,018,767 | 1/2000 | Fijolek et al. | 709/218 |
| 6,028,860 | 2/2000 | Laubach | 370/395 |
| 6,032,266 | 2/2000 | Ichinoche et al. | 714/9 |
| 6,049,826 | 4/2000 | Beser | 709/222 |
| 6,052,819 | 4/2000 | Barker et al. | 714/776 |
| 6,055,224 | 4/2000 | King | 370/217 |
| 6,058,421 | 5/2000 | Fijolek et al. | 709/225 |
| 6,065,049 | 5/2000 | Beser et al. | 709/218 |
| 6,070,246 | 5/2000 | Beser | 713/201 |

OTHER PUBLICATIONS

Data–Over–Cable Service Interface Specifications; Radio Frequency Interface Specification; SP–RFI–I04–980724; Cable Television Laboratories, Inc.; 1997; pp. 1–196.

Data–Over–Cable Service Interface Specifications; Cable Modem to Customer Premise Equipment Interface Specification; SP–CMCI–I02–980317; 1998; Cable Television Laboratories, Inc.; pp. 1–40.

Data–Over–Cable Service Interface Specifications; Cable Modem Telephony Return Interface Specification; SP–CMTRI–I01–970804; 1997; Cable Television Laboratories, Inc.; pp. 1–74.

Data–Over–Cable Service Interface Specifications; Radio Frequency Interface Specification; SPRFIv1.1–I01–990311; 1999; Cable Television Laboratories, Inc.; pp. 1–310.

Data–Over–Cable Service Interface Specifications; Operations Support System Interface Specification Baseline Privacy Interface MIB; SP–OSSI–BPI–I01–980331; 1997 & 1998; MCNS Holdings, LP; pp. 1–33.

Data–Over–Cable Service Interface Specifications; Operations Support System Interface Specification; SP–OSSI–I02–990113; 1999; Cable Television Laboratories, Inc.; pp. 1–26.

Data–Over–Cable Service Interface Specifications; Operations Support System Interface Specification Radio Frequency Interface; SP–OSSI–RFI–I03–990113; 1999; Cable Television Laboratories, inc.; pp. 1–29.

Radio Frequency (RF) Interface Management Information Base for MCNS Complaint RF Interfaces draft–ietf–ipcdn–rf–interface–mib–04.txt; May 22, 1998; Guenter Roeck (editor); pp. 1–55.

Cable Device Management Information Base for MCNS Complaint Cable Modems and Cable Modem Termination Systems draft–ietf–ipcdn–cable–device–mib–04.txt; May 22, 1998; Guenter Roeck (editor); pp. 1–32.

Baseline Privacy Interface Management Information Base for MCNS Complaint Cable Modems and Cable Modem Termination Systems; R. Woundy; Jan. 17,1999; pp. 1–35.

Logical IP Subnetworks over IEE 802.14 Services; Mark Laubach; Mar. 13, 1998; pp. 1–13.

A Distribute Queueing Random Access Protocol for a Broadcast Channel: Wenxin Xu and Graham Campbell; Illinois Institute of Technology (Comp. Science Dept.); pp. 1–9.

CBR Channels on a DQRAP–based HFC Network; Chien–Ting Wu, Graham Campbell; Illinois Institute of Technology (Comp. Science Dept.); pp. 1–14.

Interleaved DQRAP with Global TQ; Chien–Ting Wu, Graham Campbell; Illinois Institute of Technology (Comp. Science Dept.); pp. 1–27.

The Extended DQRAP (XDARAP) Algorithm; Chien–Ting Wu Graham Campbell; Illinois Institute of Technology (Comp. Science Dept.); Dec. 9, 1994; pp. 1–4.

Extended DQRAP (EXQRAP) A Cable TV Protocol Functioning as a Distributed Switch; Chien–Ting Wu & Graham Campbell; Illinois Institute of Technology (Comp. Science Dept.); pp. 1–7.

A Review of Contention Resolution Algorithms for IEEE 802.14 Networks; Nada Glomie; Yves Saintillan, & David H. Su; National Institute of Standards and Technology; pp. 2–12.

Multimedia Networks Group; IEEE 802.14 Overview; pp. 1–3.

On IEEE 802.14 Medium Access Control Protocol; Ying–Dar Lin; 1998; pp. 1–13.

On IEEE 802.14 Medium Access Control Protocol; Ying–Dar Lin; 1998; pp. 1–11.

On IEEE 802.14 Medium Access Control Protocol; Ying–Dar Lin; 1998; pp. 1–10.

Hybrid–Fiber Coax; Hung Nguyen and Felix Yao; Apr. 22, 1996; pp. 1–11.

Cable Data Modem Performance Evaluation, A Primer for Non–Technical Readers; Cable Television Laboratories, Inc.; Nov. 15, 1996; pp. 1–8.

High Speed Cable Modems, Including IEEE 802.14 Standards; Albert A. Azzam; Chapters 5, 6.

Cable Device Management Information Base for DOCSIS Compliant Cable Modems and Cable Modem Termination Systems; Michael St. Johns; Mar. 30, 1999; pp. 1–54.

Radio Frequency (RF) Interfaces Management Information Base for MCNS/DOCSIS Compliant RF Interfaces; Mike St. Johns, (Editor); Feb. 17, 1999; pp. 1–67.

Telephony–Return Interface (TRI) Management Information Base for DOCSIS complaint Telephony–Return Cable Modems and Cable Modem Termination systems; S. Adiraju, J. Fijolek; Apr. 2, 1999; pp. 1–27.

Data Over Cable System Quality of Service Management Information Base (DOCSIS–QOS MIB); Mike Patrick; J. Harvey; Motorola ING; Jun. 25, 1999; pp. 1–43.

Docsis 1.1 IGMP MIB; H. Abramson, Motorola; Jun. 1999; pp. 1–13.

Publications and Technical Reports of Dolors Sala—Home Page; pp. 1–6.

Scheduling Disciplines for HFC Systems: What can we learn from ATM scheduling?; Dolors Sala, John O. Limb; GA Tech; pp. 1–6.

A Protocol for Efficient Transfer of Data over Fiber/Cable Systems; Dolors Sala, John O. Limb; GA Tech; pp. 1–8.

MAC Protocols for Multimedia Data over HFC Architecture; Dolors Sala Batlle; Oct. 27, 1995; pp. 1–28.

An Access Protocol to Support Multimedia Traffic Over Hybrid Fiber/Coax Systems; John O. Limb, Dolors Sala; pp. 1–6.

Simulation of the Performance of XDQRAP under a Range of Conditions; John O. Limb, Dolors Sala, Json Collins, David Hartman, Daniel Howard; pp. 1–10.

Interleaved DQRAP with Global TQ; Chien–Ting Wu, Graham Campbell; Illinois Institute of Technology, CS Dept.; Jan. 8, 1995; pp. 1–26.

Extended DQRAP (EXQRAP); Chien–Ting Wu, Graham Campbell; Illinois Institute of Technology, CS Dept.; Jan. 8, 1995; pp. 1–4.

Cisco Hot Standby Router Protocol (HSRP); T. Li, . Cole, P. Morton. D. Li.; Mar. 1998; pp. 1–17.

Address Allocation for Private Internets; Y. Rekhter, B. Moskowitz, D. Karrenberg, G. De Groot; Mar. 1994; pp. 1–8.

Network 10 Considered Harmful; E. Lear, E. Fair, D. Crocker, T. Kessler; Jul. 1994, pp. 1–8.

Unique Addresses are Good; E. Gerich; Jun. 1995; pp. 1–3.

Address Allocation for Private Internets; Y. Rekhter, B. Moskowitz, D. KarrenbertG.J. De Groot, E. Lear; Feb. 1996; pp. 1–9.

The IP Network Address Translator (NAT); K. Egevang, P. Francis; May 1994; pp. 1–10.

IP Network Address Translator (NAT) Terminology and Considerations; P. Srisuresh, M. Holdrege; Aug. 1999; pp. 1–30.

Load Sharing Using IP Network Address Translation (LSNAT); P. Srisuresh, D. Gan; Aug. 1998; pp. 1–18.

DNS Extensions to Network Address Translators (DNS_ALG); P. Srisuresh, G. Tsirtsis, P. Akkiraju, A. Hefferman; Sep. 1999; pp. 29.

Security Model with Tunnel–Mode IPsec for NAT Domains; P. Srisuresh; Oct. 1999; pp. 1–11.

Network Address Translation—Protocol Translation (NAT–PT); G. Tsirtsis, P. Srisuresh; Feb. 2000; pp. 1–21.

Stateless IP/ICMP Translation Algorithm (SIIT); E. Nordmark; Feb. 2000; pp. 1–26.

FTB Extensions for IPv6 and NATs; M. Allman, S. Ostermann, C. Metz; Sep. 1998; pp. 1–8.

Dynamic Host Configuration Protocol; R. Drome; Bucknell University; Oct. 1993; pp. 1–39.

TCPI/IP Illustrated, vol. 1, The Protocols; W. Richard Stevens; Chapters: 1,2,3,4,9,10,11,16,25.

* cited by examiner

DATA TRAFFIC CONTROL IN A DATA MODEM SYSTEM

CROSS REFERENCE TO RELATED APPLICATION

The present patent application claims priority from a U.S. Provisional Application, Ser. No. 60/035,618, titled Cable Data Network System, filed Jan. 17, 1997, with Scott E. Hrastar, Mark E. Schutte, Roy A. Bowcutt, David A. Sedacca, and Todd A. Merrill listed as inventors.

BACKGROUND OF THE INVENTION

1. Technical Field

This invention relates to the field of cable data delivery systems and more particularly, is directed to a method and apparatus for controlling data traffic throughput in a cable data delivery system.

2. Description of the Relevant Art

In the not-too-distant past, images could be processed and displayed only by large, special-purpose computer systems. Owners of lower-cost and less-powerful computers such as personal computers had to be content with character-based displays. The cost of memory has dropped so quickly and the power of microprocessors has increased so greatly in recent years, however, that modern personal computers are completely capable of processing and displaying images. Indeed, modern graphical user interfaces depend to a large extent on this capability.

The old problems with images has returned, however, in another area, namely network computing. In network computing, the personal computer or work station is connected to a network and is able to use the network to retrieve the data it is processing from remote locations. The most recent development in network computing is the Internet, a world-wide logical network which permits anyone who has access to the Internet to interactively retrieve data including images from just about anywhere in the world. For example, using the Internet, it is possible to retrieve pictures of the latest restoration projects in Florence, Italy from that city's home page on the World Wide Web.

The main drawback to interactively retrieving data on the Internet is the length of time it takes to download and display images. The problem is so serious that many people set up the program they use to access the Internet so that it does not download images. Doing this restricts the user to character data, but greatly decreases the time it takes to access information. The bottleneck in retrieving images from the Internet is not the personal computer, but rather the lack of capacity or bandwidth of the networks over which the images must be retrieved. One part of the network where bandwidth is particularly restricted is the analog telephone line that connects most PC users to the Internet.

It has been known for years that the bandwidth of the telephone system can be increased by replacing the analog system with a digital system, but all of the known techniques for doing this require extensive modification of the telephone system.

A great many homes do in fact have a high bandwidth connection, namely that provided by cable television. The problem with this connection in the past has been that the connection is one way. A PC may receive data via a home's CATV cable, but it may not be able to use the cable to send data. Again, ways of making the CATV system bidirectional have been known for years. The problem here is not the technology, but the fact that in many cases its introduction requires extensive modification of most existing CATV systems.

Given that many homes have a CATV cable and virtually all homes have an analog telephone line, systems have been proposed in which the CATV cable is used to send data from the Internet to the PC and the telephone line used to return data from the PC to the Internet. These systems take advantage of the fact that by far the most common pattern of interaction between users and networks is for the user to retrieve a large amount of data over the network, for example an image of a restored art work from Florence, examine the image, and then send a few keystrokes over the network. With this kind of interaction, far less bandwidth is needed in the channel that is used to return the keystrokes than in the channel that is used to retrieve the image.

An example of such a system is the one disclosed in Moura, et al., Asymmetric Hybrid Access System and Method, U.S. Pat. No. 5,586,121, issued Dec. 17, 1996, and in Moura, et al., Remote Link Adapter for use in TV Broadcast Data Transmission System, U.S. Pat. No. 5,347,304, issued Sep. 13, 1994. In this system, the head end of a cable system has high bandwidth access to the Internet or to other networks and access via CATV cables and the telephone system to households or businesses with PCs. Data received from these networks is sent to PCs connected to the cable system's cables and responses from the PCs are collected via the telephone system and sent to the network. In the home or business, the PC is connected either directly or via a local area network to a device which includes both a radio frequency modem and a standard analog telephone modem. The radio frequency modem is connected to the CATV cable. It receives and decodes the data sent on the CATV cable and provides it to the PC. The telephone modem is connected to a standard telephone line. It receives data from the PC and sends it to the CATV head end, which in turn forwards it to the Internet or other networks.

While systems such as the one disclosed in the Moura patents do provide a solution to the bandwidth problem, they have a number of deficiencies, particularly when used in the context of the Internet. Among the deficiencies are the following:

The system of Moura wastes Internet Protocol (IP) addresses for the computers attached to the modem. IP addresses are in short supply. In the system of Moura, however, IP addresses are statically assigned to the PCs and are consequently not available for reuse when a PC is idle or not engaged in an activity which involves network access.

From the point of view of the Internet, the system of Moura is a link level system, that is, the components of the system of Moura do not themselves have IP addresses and cannot themselves execute IP protocols. In particular, IP routing is not used within the system of Moura. One difficulty arising from this situation is that IP routing is centralized in the IP router that connects the head end to the Internet; another is that the modem in the system of Moura cannot function as an IP router.

In Moura, the telephone connection to the modem is used solely to transfer data from the PC and modem to the head end. All data received by the PC and modem is sent via the CATV cable. Consequently, when the CATV system fails, the PC is left without a connection by which it can receive data. This situation is made even less desirable by the fact that CATV systems are far more likely to fail than the telephone system.

The CATV channel to which the modem of Moura responds is statically assigned to a given modem, thereby rendering the channel unavailable for use by other modems when the PC connected to the given modem is idle or is not engaged in an activity which involves network access.

The Moura system is further deficient in that it does not have adequate provisions for preventing unauthorized use of the system. Thus, the system is subject to revenue loss for the system provider. Such losses result in an overall increase in the operating cost of the system, which ultimately must be passed on to the authorized subscribers.

Accordingly, there is a great need for a system like the one disclosed by Moura, but which is not burdened by the aforementioned deficiencies. Moreover, systems of the type described by Mours make it very important that the data network be manager in a very efficient manner.

In those cases where the return path from the PC to, for example, the Internet, are though the CATV system, maximum utilization of system resources can only be achieved through effective management of the traffic through the system. Systems in the past have been deficient in this area.

SUMMARY OF THE INVENTION

In accordance with the present invention, there is provided a method and apparatus which monitors data traffic, through, for example, a cable data network, in order to guarantee a minimum and maximum bandwidth and burst length. Traffic statistics are kept as credits that are only updated as needed.

Each cable modem in the network is assigned a limit on the maximum amount of traffic that it may transmit and receive depending on the service level that the subscriber has purchased. When that limit is exceeded, traffic for that modem will no longer allowed to pass through the system.

Thus, the system of the present invention provides an efficient way of managing a cable data network in accordance with the service levels of each of its subscribers.

Further details and features of the present invention will be understood from reading the detailed description of the invention in view of the drawings.

BRIEF DESCRIPTION OF THE PREFERRED EMBODIMENT

Figure 1:
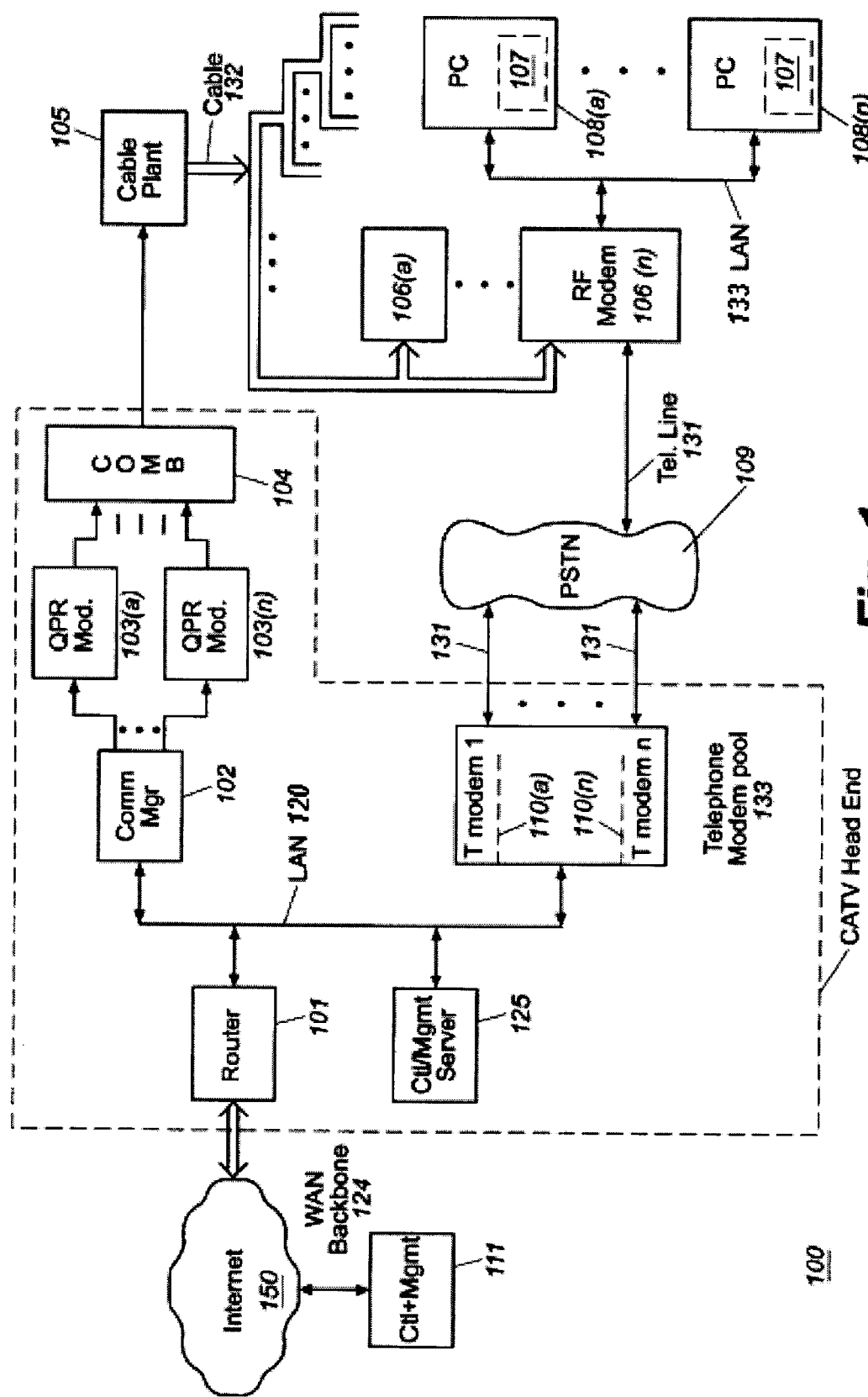
FIG. 1 is an overview of the physical components of the cable data network.

FIG. 1 shows the physical components of cable data network 100 in which the present invention may be implemented. The cable data network illustrated in FIG. 1 is merely one example of a network in which the present invention may be applied.

A full description of a cable data network of the type illustrated in FIG. 1 may be found in commonly assigned application Ser. No. 08/835,917 filed Apr. 11, 1997 and entitled "Usage Statistics Collection For A cable Data Delivery System" which is incorporated herein by reference.

As shown in FIG. 1, cable data network 100 transfers data packets with IP addresses between Internet 150 and hosts 108, which may be PCs or work stations. Cable data network 100 also transfers packets with IP (Internet Protocol) addresses among the components of cable data network 100 and uses Internet 150 to exchange data packets with IP addresses between cable data network 100 and remotely-located control and management components 111. These components typically deal with functions such as receiving information about new subscribers or billing.

Cable data network 100 may be implemented in a cable television (CATV) system. Packets from Internet 150 that contain the IP address of a host 108(*i*) are received in CATV head end 122, are put in the proper form for transmittal over cable 132 belonging to the CATV system, and are transmitted via cable 132 to RF modem 106(*j*) to which destination host 108(*i*) is attached. RF modem 106(*j*) reads the IP address of host 108 from the packet and routes the packet to host 108(*i*). Packets from host 108(*i*) which are intended for a destination in Internet 150 go to RF modem 106(*j*), which routes them via telephone line 131 and public switched telephone network (PSTN) 109 to a telephone modem (Tmodem) 110(*k*) in telephone modem pool 135 in head end 122. Tmodem 110(*k*) routes the packet to router 101, which routes it to Internet 150. Since public switched telephone network 109 allows bidirectional communication, router 101 may also route packets received from Internet 150 for host 108(*i*) to host 108(*i*) via Tmodem 110(*k*) and RF modem 106(*j*). This route may be used in the event of a failure in the CATV portion of network 100.

Continuing with the details of the implementation of cable data network 100, data packets are transferred between Internet 150 and CATV head end 122 by means of a transmission medium belonging to a wide-area backbone network 124. Typically, the transmission medium will be a high-speed, high-capacity fiber optic cable such as a T1 or T3 cable, but it could also be a terrestrial or satellite microwave link. The transmission medium is connected to router 101, which in a preferred embodiment may be a router belonging to the 7000 series manufactured by Cisco Systems, Inc., San Jose, Calif.

Router 101 is coupled between WAN backbone 124 and local-area network (LAN) 120, which is the link-level network that connects the components of cable data network 100 which are located in CATV head end 122. Router 101 may both receive packets from backbone 124 or LAN 120 and provide them to backbone 124 or LAN 120. Each component connected to LAN 120 has both an IP address and a LAN address on LAN 120, and router 101 contains a routing table which it uses to route IP packets to IP hosts, including other routers. Router 101 examines every packet it receives on WAN backbone 124 or LAN 120; if the packet's destination IP address is one of the ones in the routing table, router 101 routes it to the component on LAN 120 which is to receive IP packets having that address; if it is not one of the addresses in the routing table, router 101 routes it to WAN backbone 124, which takes it to Internet 150. In each case, router 101 puts the data packet into the proper form to be transmitted via the relevant link-level network.

As will be apparent from the foregoing discussion, LAN 120 and router 101 can be used to route IP packets received from Internet 150 and destined to a host 108 via two routes. The first is via communications manager 102 and cable plant 105, cable 132, and RF modem 106. The second is to host 108 via telephone modem pool 135 and RF modem 106. Packets from host 108 and from RF modem 106 go via telephone modem pool 135 and LAN 120 to router 101. In other embodiments, it is also possible to route packets addressed to RF modem 106 via the first route. Router 101 can finally route packets via Internet 150 between the components in head end 122, hosts 108, RF modems 106, and control and management component 111.

Figure 2:
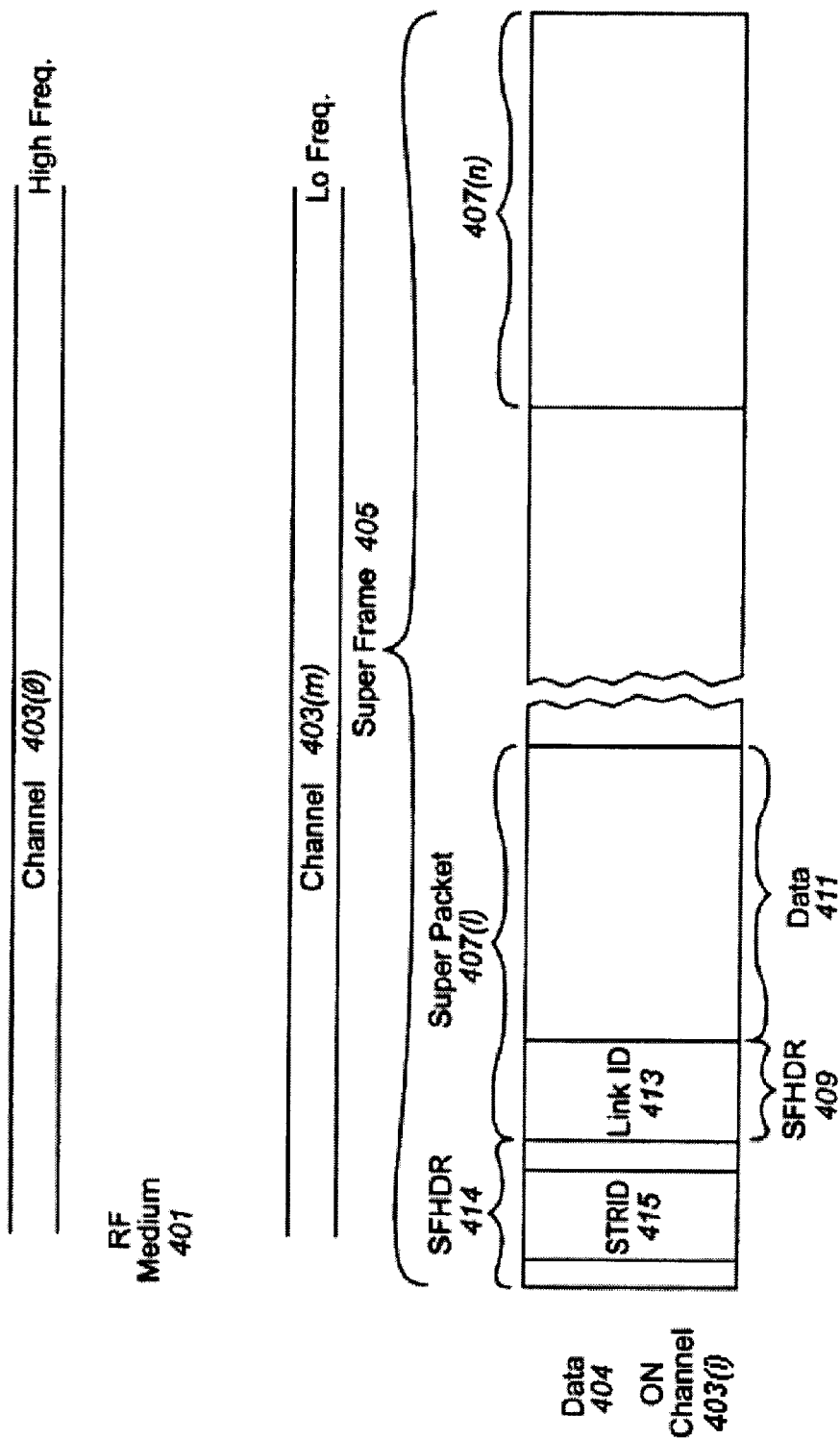
FIG. 2 shows the channels, superframes, and superpackets used to carry data on the RF link in a cable data network.

When packets are to go to a host 108 via cable 132, they are routed to communications manager 102, which puts the packets into the proper form for transport by that link-level network. FIG. 2 shows how data is transported on cable 132. Cable 132 is an RF medium 401 which carries data in a fixed number of channels 403. Each channel 403 occupies a portion of the range of frequencies transported by cable 132. Within a channel 403($i$), data moves in superframes 405. Each superframe contains a superframe header 414 and a fixed number of fixed-sized superpackets 407.

The superframe header includes a stream identifier (STRID) 415 which is a unique identifier for the stream of data carried on channel 403. The combination of a channel's frequency and the stream identifier 415 uniquely identifies the network to which cable 132 belongs in the CATV system. This unique identification of the network cable 132 belongs to is used by communications manager 102 to determine which network should receive the IP packets intended for hosts 108 connected to a given RF modem 106($i$).

Each superpacket 407 contains a header 409 and data 411. The header contains a link identifier (LinkID) 413 in cable network 132 for an RF modem 106. The number of superpackets 407 is the number of pipes in channel 403($i$). When a given RF modem 106($i$) is active, it is associated with a <channel,pipe,link ID> triple, that is, the RF modem 106($i$) is tuned to the channel 403($j$) specified in the triple and watches the superpackets that belong to the pipe specified in the triple. For example, if the RF modem is associated with pipe 3, it watches superpacket 407(3) in superframe 405, and if superpacket 407(3)'s header 409 contains RF modem 106($i$)'s Link Id 413, RF modem 106($i$) reads data 411 from superpacket 407(3). The <chanel,pipe,LinkID>triple is thus the link address of RF modem 106($i$) on cable 132. Data 411 is of course all or part of an IP packet 301. If the IP address of packet 301 specifies a host 108 connected to RF modem 106($i$), RF modem 106($i$) routes it to that host 108.

Returning to communications manager 102, that component receives IP packets 301 addressed to hosts 108 connected to networks whose link layers are cables 132 connected to head end 105 and routes them to the proper RF modems 106 for the hosts. It does so by relating the IP address of an active host 108 to one of the networks and within the network to a <channel,pipe,linkID> triple specifying the RF modem 106 to which the host 108 is connected. As employed in the present context, an active host is one that currently has an IP address assigned to it. Using the information in the routing table, communications manager 102 makes superframes 405 for each channel 403($i$) in the network containing cable 132. The superframes contain superpackets 407 directed to the RF modems 106 connected to that channel for which communications manager 102 has received IP packets 301. The superframes are stored in a dual-ported memory which is accessible to QPR modulators 103.

There is a QPR modulator 103 for each channel 403 in a given network, and the QPR modulator reads the superframes for its channel, digitally modulates the RF signal for the channel according to the contents of the superframes, and outputs the modulated signal to combiner 104, which combines the outputs from all QPR modulators and provides the combined output to cable plant 105, which outputs it to cables 132 belonging to the network. The QPR modulators employ quadrature partial response modulation. Of course, any kind of digital RF frequency modulation could be employed as well. It should also be pointed out that any arrangement could be employed which relates a given RF modem 106 to a portion of the bandwidth of the network to which cable 132 belongs, rather than the <channel,pipe, LinkID> triple used in the preferred embodiment, and that the portion of the bandwidth that carries packets addressed to hosts 108 connected to a given RF modem 106 can be termed in a broad sense the RF modem's "channel".

Following cable 132 to RF modem 106, RF modem 106 is connected between cable 132, a LAN 133 to which one or more hosts 108 are connected, and telephone line 131 and provides interfaces to cable 132, LAN 133, and telephone line 131.

Turning to the interfaces and beginning with the interface to cable 132, that interface has two main components, tuner 501 and decoder 503. Tuner 501 can be tuned under control of CPU 505 to a channel 403($i$) in cable 132. Tuner 501 further demodulates the superframes 405 it receives on that channel and passes them to decoder 503. Decoder 503 examines superpacket 407($i$) for the pipe which carries data addressed to RF modem 106, and if LinkID 413 in superpacket 407($i$) specifies RF modem 106, decoder 503 does error correction, decodes the data, and passes it to memory 507. When an IP packet has accumulated in memory 507, CPU 505 examines the destination IP address in the packet, and uses a routing table in memory 507 to determine whether the packet is addressed to a host 108 connected to RF modem 106. If the packet is so addressed, CPU 505 obtains the LAN address corresponding to the IP address. CPU 505 provides the LAN address and the location of the packet in memory 507 to Ethernet integrated circuit 515, which packages the packet into one or more Ethernet frames and outputs it to Ethernet 133.

RF modem may also receive IP packets via phone line 131 and modem chip 517 that are addressed either to the RF modem 106 itself or to one of the hosts 108 connected to RF modem 106. In the first case, RF modem 106 responds to the packet; in the second, it routes the packet to the host as just described for packets from cable 132. When RF modem 106 receives a packet via LAN 133 that is not addressed to RF modem 106 itself, it routes the packet via modem chip 517 and telephone line 131. Included in host 108 is the software 107 necessary to interact with RF modem 106.

Returning again to communication manager 106, this device monitors data traffic through the network to guarantee a minimum and maximum bandwidth and burst length. Communication manager 106 maintains traffic statistics in the form of credits that are updated as needed. As discussed above, the communication manager routes IP packets received at its inputs to the appropriate output ports based on the destination address specified in each incoming packet. It also controls modem 106's access to the cable data network and the allocation of upstream bandwidth via the media access control protocol specified in the Data Over Cable Service Interface Specification as know by those of ordinary skill in the art.

Each cable modem 106 normally will have a limit of the maximum amount of traffic that it may transmit and receive. Some modems may have guaranteed minimum bandwidth that they are entitled to. These limits and guarantees describe the class of service of each particular modem as subscribed to by the subscriber.

In order to manage network traffic, communication manager 102 includes a control block associated with a modem's class of service. Statistics are stored for traffic monitored in the upstream and downstream directions. The control block includes the following elements:

TotalCreditCountUP, TotalCreditCountDS: These are the total number of bytes that may be transmitted in the upstream and downstream directions before the data is discarded or the request ignored/delayed.

LastUpdateTimeUS, LastUpdateTimeDS: These are the value of sysUPTime when the TotalCreditCountUS TotalCreditCountDS values were last updated.

MaxDataRateUS, MaxDataRateDS: These are maximum data transfer rates permitted in assocation with this service.

MaxBurstSizeUS, MaxBurstSizeDS: These are the maximum burst lengths permitted for traffic associated with this serivce.

When a packet is received, communication manager 102 determines whether to service the packet by comparing the packet size to the transmission credits currently available for the service. The transmission credits are calculated based on the following algorithm:

1. Calculate the time since the TotalCreidtCountXX field was last updated:

$\Delta t$=sysUpTime−LastUpdateTimeXX;

LastUpdateTimeXX=sysUpTime.

2. Determine the number of credits to add to TotalCreditCountXX:

creditToAdd=$\Delta t$* MaxDaRateXX.

3. Add additional credits to total count:

TotalCreditCountXX=TotalCreditCountXx+creditsToAdd.

4. Truncate the total count if necessary:

If (TotalCreditCountXX>MaxBurstSizeXX) then TotalCrdit-CountXX=MaxBurstSizeXx.

Once the communication manager 102 has determined that the packet will not exceed the transmission rate available to the service, the communication will schedule transmission of the packet.

Figure 3:
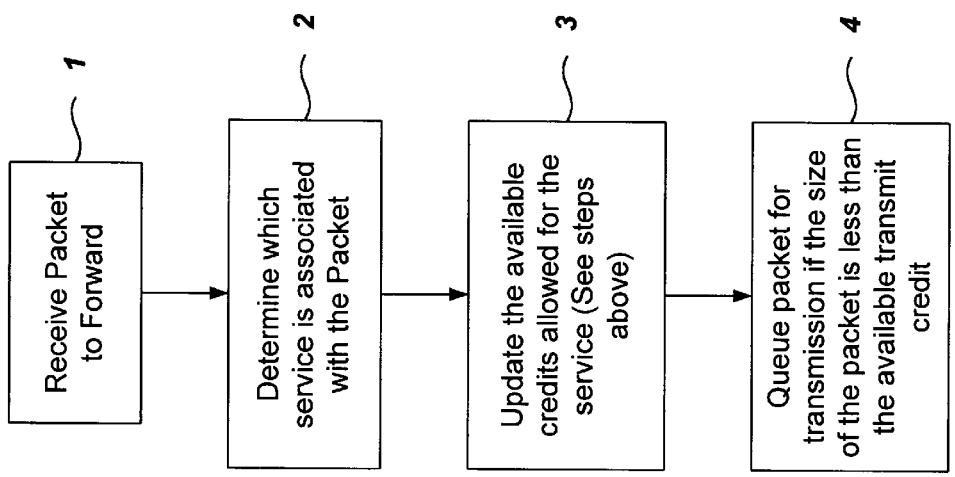
FIG. 3 is a flow chart of the process used by the present invention to monitor and control traffic throughput in a cable data network.

FIG. 3 is flow chart illustrating the process used by communication manager 102 in managing traffic throughput for a cable data network. In block 1, the communication manager receives the packet to be forwarded. In block 2, the communication manager determines which service is associated with the packet. In block 3, the communications manager updates the available credit allowed for the service. In block 4, the packet is put in a queue for transmission if the size of the packet is less than the available transmission credits.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. In a cable data delivery network for transferring digital data in the form of data packets with a subscriber host location, an apparatus for controlling data traffic through said network, said apparatus comprising:

storage means for maintaining data comprising data traffic statistics and at least one time value, said data traffic statistics comprising a data rate, said data rate relating an amount of data to an amount of time during which said amount of data is transferred;

packet receiving means for receiving said data packets;

routing means for routing said data packets in accordance with an address, said data packets capable of being transferred between said subscriber host location and said routing means; and control means coupled to said storage means, to said packet receiving means and to said routing means for controlling the routing of said data packets in accordance with said at least one time value measuring an elapsed amount of time over which said data packets are transferred between said subscriber host location and said routing means, said transfer of said data packets over said elapsed amount of time being within a limit of said data rate.

2. The apparatus of claim 1, wherein said storage means maintains said data traffic statistics and said at least one time value on a subscriber basis.

3. The apparatus of claim 2, wherein said apparatus further comprises monitor means coupled to said packet receiving means and to said storage means for monitoring said data packets to determine a monitored size associated with said data packets which are received by said apparatus.

4. The apparatus of claim 3, wherein the data maintained by said storage means further comprises data transmission credits associated with a subscriber, said control means controlling the routing of said data packets in accordance with a comparison between said data transmission credits and said monitored size of said data packets.

5. The apparatus of claim 4, wherein said control means prevents the routing of said data packets to said subscriber host location responsive to said monitored size of said data packets exceeding said data transmission credits.

6. The apparatus of claim 1, wherein said data rate is a maximum data rate.

7. The apparatus of claim 1, wherein said data traffic statistics comprise upstream statistics and downstream statistics and wherein said at least one time value comprises an upstream time value and a downstream time value.

8. The apparatus of claim 1, wherein said data traffic statistics further comprise said at least one time value.

9. The apparatus of claim 4, wherein said data transmission credits comprise an upstream data transmission credit and a downstream data transmission credit.

10. The apparatus of claim 4, wherein said at least one time value comprises a last update time value which is assigned a value of a system-up-time clock responsive to said data transmission credits being updated.

11. The apparatus of claim 10, wherein said data transmission credits are increased by an amount derived by multiplying said data rate times a difference between a current value of said system-up-time clock and said last update time value.

12. The apparatus of claim 11, wherein said data traffic statistics further comprise a maximum burst size and wherein responsive to logic that determines that said data transmission credits exceed said maximum burst size, said data transmission credits are set equal to said maximum burst size.

13. The apparatus of claim 4, wherein said data traffic statistics further comprise said data transmission credits.

14. In a cable data delivery network for transferring digital data in the form of data packets with a subscriber host location, a method for controlling data traffic through said network, said method comprising the steps of:

maintaining data comprising data traffic statistics and at least one time value, said data traffic statistics comprising a data rate, said data rate relating an amount of data to an amount of time during which said amount of data is transferred;

receiving said data packets using a receiving means;

routing said data packets in accordance with an address, said data packets capable of being transferred between said subscriber host location and said routing means; and controlling the routing of said data packets in accordance with said at least one time value measuring an elapsed amount of time over which said data packets are transferred between said subscriber host location and said routing means, said transfer of said data packets over said elapsed amount of time being within a limit of said data rate.

15. The method of claim 14, wherein said data rate is a maximum data rate.

16. The method of claim 14, wherein said data traffic statistics comprise upstream statistics and downstream statistics and wherein said at least one time value comprises an upstream time value and a downstream time value.

17. The apparatus of claim 14, wherein said data traffic statistics further comprise said at least one time value.

18. The method of claim 14, wherein said data traffic statistics and said at least one time value are maintained on a subscriber basis.

19. The method of claim 18, wherein said method further comprises the step of monitoring said data packets to determine a monitored size associated with said data packets which are received during said receiving step.

20. The method of claim 19, wherein said maintained data further comprises data transmission credits associated with a subscriber and wherein said controlling step is performed in accordance with a comparison between said data transmission credits and said monitored size of said data packets.

21. The method of claim 20, wherein the routing of said data packets to said subscriber host location is prevented in said controlling step responsive to said monitored size of said data packets exceeding said data transmission credits.

22. The method of claim 20, wherein said data transmission credits comprise an upstream data transmission credit and a downstream data transmission credit.

23. The apparatus of claim 20, wherein said data traffic statistics further comprise said data transmission credits.

24. The method of claim 20, wherein said at least one time value comprises a last update time value which is assigned a value of a system-up-time clock responsive to said data transmission credits being updated.

25. The method of claim 24, wherein said data transmission credits are increased by an amount derived by multiplying said data rate times the difference between a current value of said system-up-time clock and said last update time value.

26. The method of claim 25, wherein said data traffic statistics further comprise a maximum burst size and wherein responsive to a determination that said data transmission credits exceed said maximum burst size, said data transmission credits are set equal to said maximum burst size.

\* \* \* \* \*

UNITED STATES PATENT AND TRADEMARK OFFICE
CERTIFICATE OF CORRECTION

PATENT NO. : 6,282,208 B1
DATED : August 28, 2001
INVENTOR(S) : Bowcutt et al.

It is certified that error appears in the above-identified patent and that said Letters Patent is hereby corrected as shown below:

<u>Title page,</u>
Item [57], ABSTRACT,
Line 9, -- be -- should be inserted between "longer" and "allowed".

<u>Column 3,</u>
Line 10, delete "Mours" and insert therefore -- Moura --
Line 11, delete "manager" and insert therefore -- managed --
Line 13, delete "are" and insert therefore -- is --
Line 30, insert "be" between "longer" and "allowed"
Line 59, delete "cable" and insert therefore -- Cable --

<u>Column 5,</u>
Line 31, delete "<chanel,pipe,LinkID>triple" and insert therefore
-- <channel,pipe,LinkID> triple --

<u>Column 6,</u>
Line 51, delete "know" and insert therefore -- known --

<u>Column 7,</u>
Line 5, delete "assocation" and insert therefore -- association --
Line 9, delete "serivce" and insert therefore -- service --
Line 15, delete "TotalCreidtCountXX" and insert therefore -- TotalCreditCountXX --
Line 24, delete "creditToAdd=$\Delta r$*" and insert therefore -- creditToAdd=$\Delta r$ * --
Line 30, delete "TotalCrdit-" and insert therefore -- TotalCredit- --

Signed and Sealed this

Second Day of July, 2002

*Attest:*

*Attesting Officer*

JAMES E. ROGAN
*Director of the United States Patent and Trademark Office*